(12) United States Patent
Kim

(10) Patent No.: US 7,743,207 B2
(45) Date of Patent: Jun. 22, 2010

(54) HARD DISK DRIVE DATA OBJECT

(75) Inventor: Daniel S. Kim, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 415 days.

(21) Appl. No.: 11/528,226

(22) Filed: Sep. 26, 2006

(65) Prior Publication Data

US 2008/0077734 A1    Mar. 27, 2008

(51) Int. Cl.
*G06F 13/00*    (2006.01)
(52) U.S. Cl. .................... 711/112; 707/602
(58) Field of Classification Search ............. 711/112
See application file for complete search history.

(56) References Cited

U.S. PATENT DOCUMENTS 6,711,520 B2 *    3/2004    Arnaout et al. ............. 702/119

OTHER PUBLICATIONS

Collins Dictionary of Computing (2000) London:Collins. Definition of buffer. Retrieved Feb. 3, 2009 from http://www.credoreference.com.*

Rochkind, M.J., Advanced UNIX Programming, $2^{nd}$ Edition, Addison Wesley, 2004, pp. 131-135.*

Tanenbaum, A.S., Structured Computer Organization, 2nd Edition, Prentice Hall, 1984, pp. 10-12.*

Webster's New World™ Computer Dictionary (2003) Wiley Publishing. Definition of read/write head retrieved Feb. 4, 2009, from http://www.credoreference.com.*

* cited by examiner

*Primary Examiner*—Pierre-Michel Bataille
*Assistant Examiner*—John P Fishburn
(74) *Attorney, Agent, or Firm*—Ben J. Yorks; Irell & Manella LLP

(57) ABSTRACT

A system for transferring data from a disk drive to an external source. The disk drive includes a circuit with embedded firmware that associates internal and output definitions with the data. The definitions and data are provided to the external source which parses the definitions and the data. The parsing engine can output the data in pre-defined format. The embedded firmware associates the same definitions for all data. Thus an external programmer does not have to know, or monitor, the file format and output format of the disk drive to write an external software application.

6 Claims, 3 Drawing Sheets

HARD DISK DRIVE DATA OBJECT

BACKGROUND OF THE INVENTION

1. Field of the Invention

The present invention relates to storing and retrieving data to and from a hard disk drive.

2. Background Information

Various electronic systems store data in non-volatile mass storage devices such as a hard disk drive. For example, personal computers contain one or more disk drives that store data and other information. Data is typically stored in files of the disk drive by the host computer in conjunction with a direct memory access ("DMA") controller. When retrieving data, the DMA controller typically specifies a system memory location. The disk drive contains internal firmware that converts the system memory location to areas of the internal disk that contain the requested information. The data is typically stored in the disk drive within a specified file format.

When writing an external software application that retrieves data from the drive the developer must know the file data format and the output format of the drive. Such an approach can be burdensome, requiring the programmer to constantly monitor revisions of the disk drive language. It would be desirable to provide a disk drive that provides an embedded format that remains the same.

BRIEF SUMMARY OF THE INVENTION

A hard disk drive that is coupled to an external source. The hard drive includes a circuit with embedded firmware that associates definitions with data that is stored on a disk of the drive. The definitions and data are provided to the external source.

DETAILED DESCRIPTION

Described is a system for transferring data from a disk drive to an external source. The disk drive includes a circuit with embedded firmware that associates internal and output definitions with the data. The definitions and data are provided to the external source which parses the definitions and the data. The parsing engine can output the data in pre-defined format. The embedded firmware associates the same definitions for all data. Thus an external programmer does not have to know, or monitor, the file format and output format of the disk drive to write an external software application.

Figure 1:
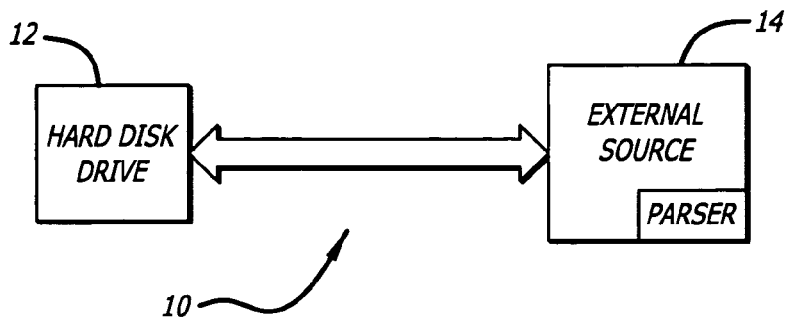
FIG. 1 is a schematic of a system for storing and retrieving data from a disk drive.

Referring to the drawings more particularly by reference numbers, FIG. 1 shows an embodiment of a data retrieval system 10. The system includes a hard disk drive 12 and an external source 14. By way of example, the external source 14 can be a host computer and associated DMA controller of a personal computer system. In general, the external source 14 can be any device that retrieves data from the disk drive.

Figure 2:
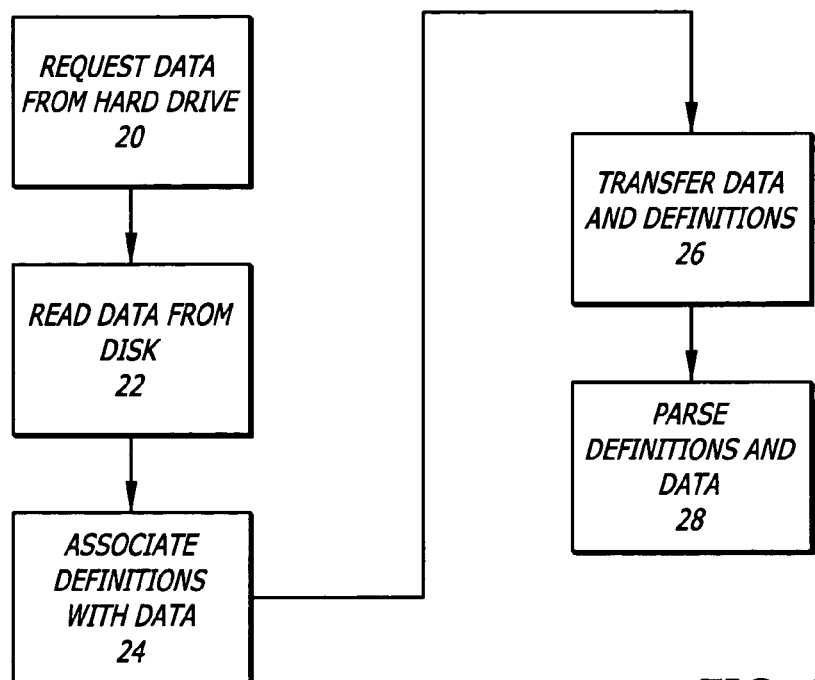
FIG. 2 is a flowchart showing the retrieval of data from the disk drive to an external source.

FIG. 2 shows a process for retrieving data from the disk drive to the external source. In block 20 the external source request data from the disk drive. The disk drive reads the data from the disk(s) of the drive in block 22. In block 24 embedded firmware of the disk drive associates and adds definitions to the data.

Alternatively, the definitions can be associated with and added to the data before being stored onto the disk of the drive. In the second embodiment, both the definitions and data are stored and subsequently read from the disk.

In block 26 the definitions and data are transferred to the external source. The external source 14 has an application that parses the definitions and data and provides an output of data in a format defined by the definitions in block 28.

The definitions may include internal definitions "iDefinitions" and output definitions "oDefinition". The internal definitions iDefinitions may define the format in which the data is stored within files of the disk drive. The following is an example, of an iDefinition file format.

```
#define BYTE          char
#define       WORD    short
#define SEEKTIME_HEADER_LEN   8
struct StructSeekHdr
{
    BYTE Header [SEEKTIME_HEADER_LEN];
    WORD SingleInWrite;
    WORD SingleOutWrite;
    WORD ThirdODInWrite;
    WORD ThirdMDInWrite;
    WORD ThirdIDInWrite;
    WORD FullInWrite;
    WORD RandomWrite;
    WORD SingleInRead;
    WORD SingleOutRead;
    WORD ThirdODInRead;
    WORD ThirdMDInRead;
    WORD ThirdIDInRead;
    WORD FullInRead;
    WORD RandomRead;
};
```

The output definitions oDefinition provide the syntax and descriptors associated with the presentation of the data. For example, the oDefinition provides the presentation of the data as it would appear on a computer monitor or a printout. The following is an example of an oDefinition data descriptor.

```
short SwapWord(short d)
{
    short data;
    data = d >> 8 | d << 8;
    return data;
}
void oDefinition( )   // example of simple data presentation
{
    int     index;
    int     head, zone;
    int     data;
    WORD    d16;
    float   dFloat;
    printf("\n\nSEEK TIME TEST RESULT (time in milliseconds)\n");
    printf("Write Mode =======================\n");
    d16 = StructSeekHdr.SingleInWrite; dFloat = SwapWord(d16);
    printf("\n (FORWARD)     : %2.03f", dFloat/1000);
    d16 = StructSeekHdr.SingleOutWrite; dFloat = SwapWord(d16);
    printf("\n (REVERSE)     : %2.03f", dFloat/1000);
    d16 = StructSeekHdr.ThirdODInWrite; dFloat = SwapWord(d16);
    printf("\n 1/3 Seek      : %2.03f", dFloat/1000);
    d16 = StructSeekHdr.ThirdMDInWrite; dFloat = SwapWord(d16);
```

-continued

```
    printf("\n 2/3 Seek       : %2.03f", dFloat/1000);
    d16 = StructSeekHdr.ThirdIDInWrite; dFloat = SwapWord(d16);
    printf("\n 3/3 Seek       : %2.03f", dFloat/1000);
    d16 = StructSeekHdr.FullInWrite; dFloat = SwapWord(d16);
    printf("\n Full Seek      : %2.03f", dFloat/1000);
    d16 = StructSeekHdr.RandomWrite; dFloat = SwapWord(d16);
    printf("\n Random Seek    : %2.03f", dFloat/1000);
    newline;newline;
}
```

Figure 3:
FIG. 3 is an illustration showing different fields of a data stream.

As shown in FIG. 3 the definitions and associated data can be provided to the external source in fields. The data stream provided to the external source may include an iDefinition field iDEF 30 that contains the internal definitions, an oDefinition field oDEF 32 that contains the output definitions and a data field DATA 34 that includes the data. Referring to FIG. 1, the external source 14 may have a parser 36 that can be programmed to identify the fields and extract the definitions and data.

Figure 4:
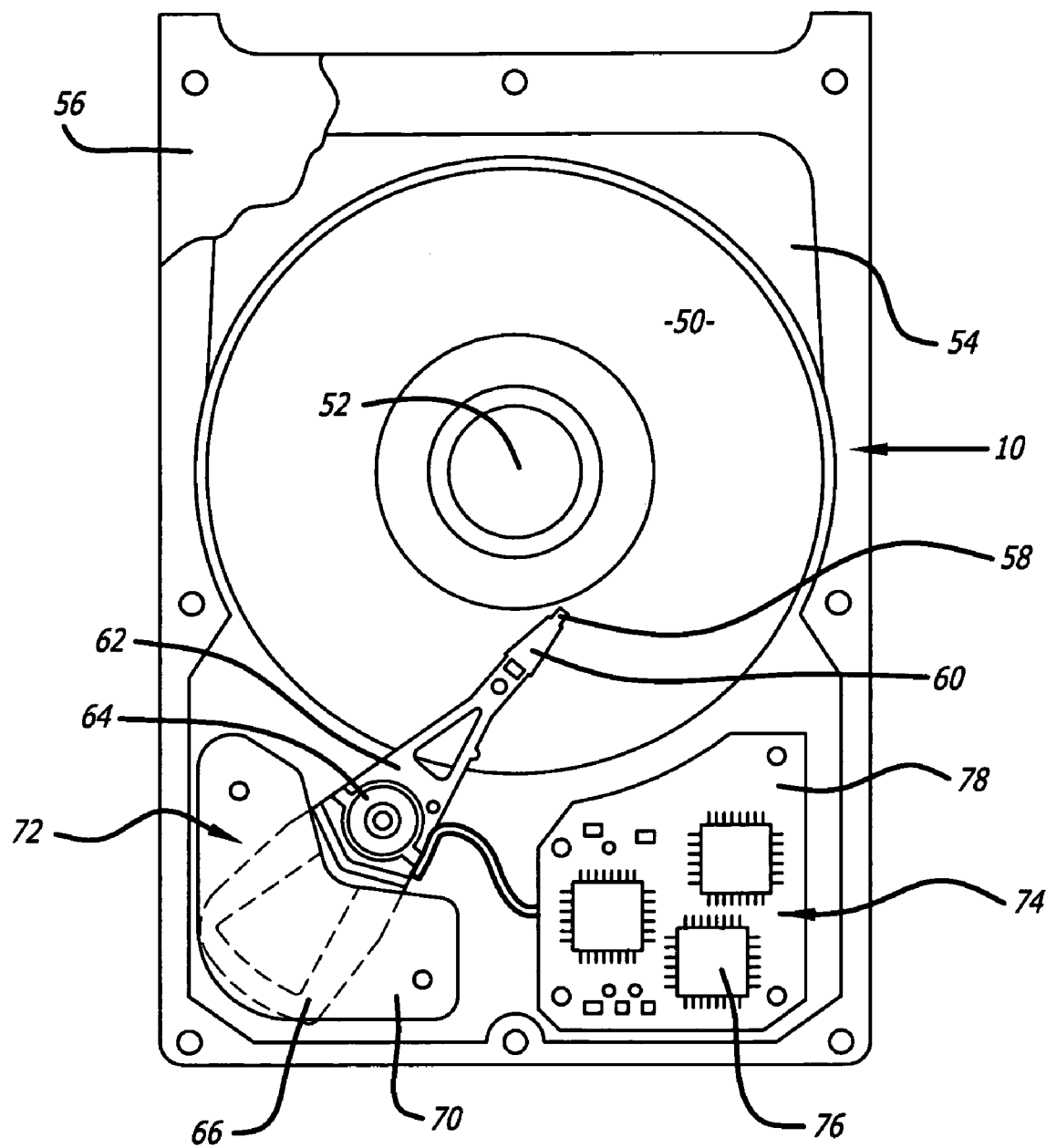
FIG. 4 is a top view of an embodiment of a hard disk drive.

FIG. 4 shows an embodiment of a disk drive 12 may include one or more magnetic disks 50 that are rotated by a spindle motor 52. The spindle motor 52 may be mounted to a base plate 54. The disk drive 12 may further have a cover 56 that encloses the disks 20.

The disk drive 12 may include a plurality of heads 58 located adjacent to the disks 50. The heads 58 may have separate write and read elements (not shown). The write element magnetizes the disk 12 to write data. The read element senses the magnetic fields of the disks 50 to read data. By way of example, the read element may be constructed from a magneto-resistive material that has a resistance which varies linearly with changes in magnetic flux.

Each head 58 may be gimbal mounted to a suspension arm 60 as part of a head gimbal assembly (HGA). The suspension arms 60 are attached to an actuator arm 62 that is pivotally mounted to the base plate 54 by a bearing assembly 64. A voice coil 66 is attached to the actuator arm 68. The voice coil 66 is coupled to a magnet assembly 70 to create a voice coil motor (VCM) 72. Providing a current to the voice coil 66 will create a torque that swings the actuator arm 68 and moves the heads 58 across the disks 50.

The hard disk drive 12 may include a printed circuit board assembly 74 that includes one or more integrated circuits 76 coupled to a printed circuit board 78. The printed circuit board 78 is coupled to the voice coil 66, heads 58 and spindle motor 52 by wires (not shown).

Figure 5:
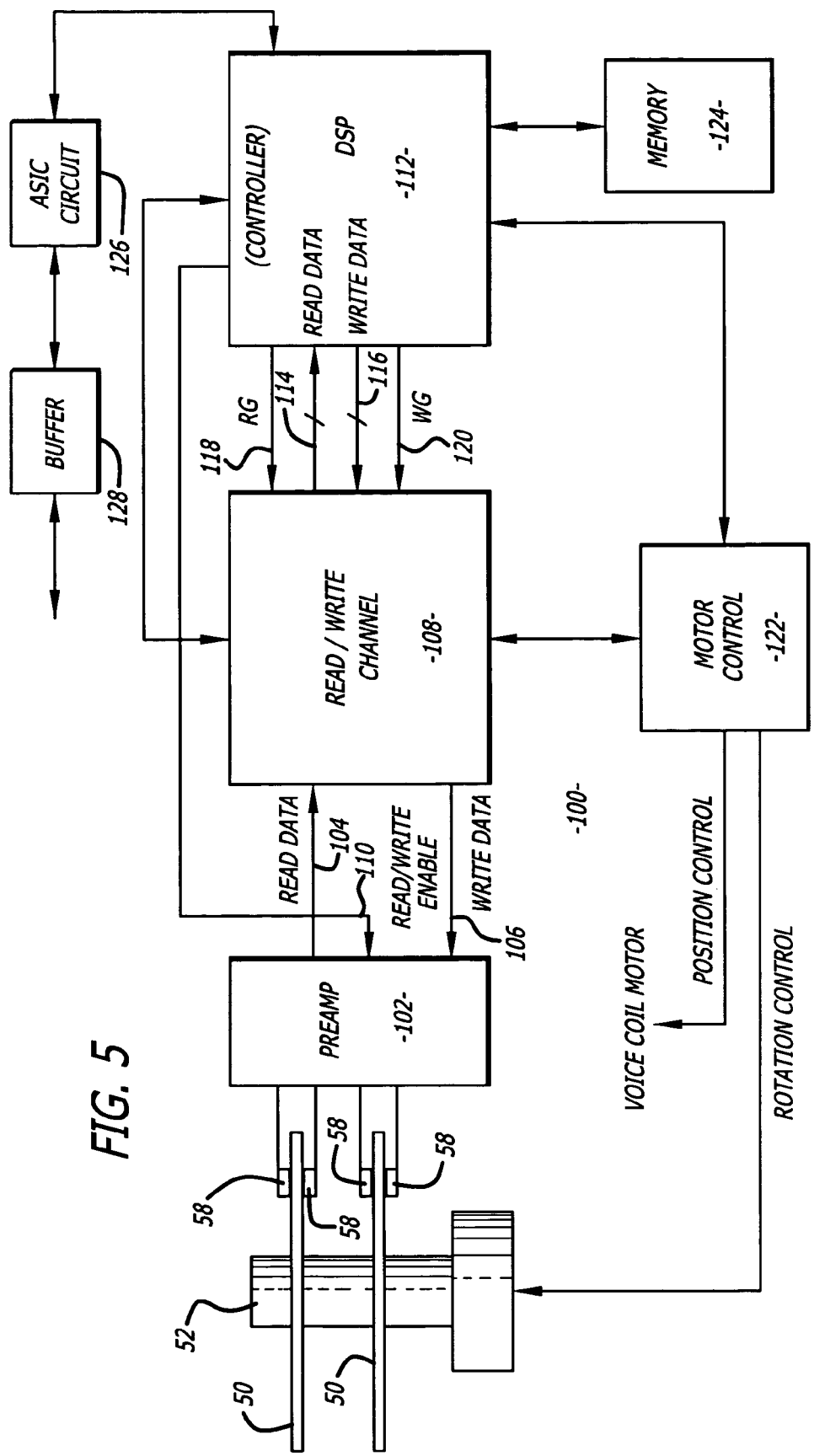
FIG. 5 is a schematic of an electrical circuit for the hard disk drive.

FIG. 5 shows an electrical circuit 100 for reading and writing data onto the disks 50. The circuit 50 may include a pre-amplifier circuit 102 that is coupled to the heads 58. The pre-amplifier circuit 102 has a read data channel 104 and a write data channel 106 that are connected to a read/write channel circuit 108. The pre-amplifier 102 also has a read/write enable gate 110 connected to a controller 112. Data can be written onto the disks 50, or read from the disks 50 by enabling the read/write enable gate 110.

The read/write channel circuit 108 is connected to the controller 110 through read and write channels 114 and 116, respectively, and read and write gates 118 and 120, respectively. The read gate 118 is enabled when data is to be read from the disks 50. The write gate 120 is enabled when writing data to the disks 50. The controller 110 may be a digital signal processor that operates in accordance with a software routine, including a routine(s) to write and read data from the disks 50. The read/write channel circuit 108 and controller 110 may also be connected to a motor control circuit 122 which controls the voice coil motor 72 and spindle motor 52 of the disk drive 12. The controller 110 may be connected to a non-volatile memory device 124. By way of example, the device 124 may be a read only memory ("ROM") that contains instructions that are read by the controller 110.

The circuit 100 may also include a circuit 126 that contains embedded firmware that associates and attaches the definitions to the data. The circuit 126 may be an application specific integrated circuit ("ASIC") designed to attach predefined definitions to the data. The circuit 126 may attach the definitions to the data before storage of data onto the disks 50 or after the data is read from the disks 50. The circuit 126 may be coupled to an input/output buffer 128 that provides an interface between the disk drive 12 and the external source 14. The buffer 128 can temporarily store the definitions and data before transfer to the external source 14.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive that is coupled to an external source, comprising:
 a buffer that receives data;
 a disk that stores said data; and,
 a circuit that is coupled to said disk and contains embedded firmware that associates definitions with said data received by said buffer and causes said definitions and data to be transferred to the external source to be parsed by the external source, said definitions include at least one internal definition that defines a file format and at least one external definition that defines a data presentation format.

2. The hard disk drive of claim 1, wherein said definitions are stored on said disk with said data.

3. The hard disk drive of claim 1, further comprising a controller coupled to said circuit.

4. A method for providing data to an external source, comprising:
 associating a plurality of definitions with data that is received by a buffer of a hard disk drive, with embedded firmware within a hard disk drive, the definitions include at least one internal definition that defines a file format and at least one external definition that defines a data presentation format;
 transferring the definitions and data from the hard disk drive to an external source; and,
 parsing the definitions and the data at the external source.

5. The method of claim 4, wherein the definitions and data are stored on a disk of the hard disk drive.

6. The method of claim 4, wherein the data and the definitions are provided to the external source in separate fields.

* * * * *